United States Patent
Shikari et al.

(10) Patent No.: US 11,678,265 B2
(45) Date of Patent: Jun. 13, 2023

(54) NOTIFICATION SUPPORT IN EXTENDED DISCONTINUOUS RECEPTION MODE

(71) Applicant: Apple Inc., Cupertino, CA (US)

(72) Inventors: Murtaza A. Shikari, Cupertino, CA (US); Srirang A Lovlekar, Cupertino, CA (US); Sethuraman Gurumoorthy, San Jose, CA (US); Haijing Hu, Beijing (CN); Fangli Xu, Beijing (CN); Srinivasan Nimmala, San Jose, CA (US); Yuqin Chen, Shenzhen (CN); Sree Ram Kodali, Sunnyvale, CA (US); Longda Xing, San Jose, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/899,303

(22) Filed: Jun. 11, 2020

(65) Prior Publication Data
US 2021/0051583 A1    Feb. 18, 2021

(30) Foreign Application Priority Data

Aug. 13, 2019    (CN) .......................... 201910746188.7

(51) Int. Cl.
| | |
|---|---|
| *H04W 52/02* | (2009.01) |
| *H04W 76/28* | (2018.01) |
| *H04W 4/06* | (2009.01) |
| *H04W 68/00* | (2009.01) |
| *H04W 4/90* | (2018.01) |
| *H04L 67/568* | (2022.01) |

(52) U.S. Cl.
CPC ....... *H04W 52/0216* (2013.01); *H04L 67/568* (2022.05); *H04W 4/06* (2013.01); *H04W 4/90* (2018.02); *H04W 68/005* (2013.01); *H04W 76/28* (2018.02)

(58) Field of Classification Search
CPC ..... H04W 52/0219; H04W 4/06; H04W 4/90; H04W 68/005; H04W 76/28; H04W 52/0248; H04L 67/2842; Y02D 30/70
See application file for complete search history.

(56) References Cited

U.S. PATENT DOCUMENTS

| | | | |
|---|---|---|---|
| 2018/0103427 A1* | 4/2018 | Griot | ................. H04W 52/0225 |
| 2018/0302946 A1 | 10/2018 | Olvera-Hernandez et al. | |
| 2019/0320455 A1* | 10/2019 | Chen | ..................... H04W 76/50 |
| 2019/0349841 A1* | 11/2019 | Ishii | ..................... H04W 48/10 |
| 2020/0128485 A1 | 4/2020 | Zhao et al. | |

FOREIGN PATENT DOCUMENTS

CN    110099430 A    8/2019

* cited by examiner

*Primary Examiner* — Marcos L Torres
(74) *Attorney, Agent, or Firm* — Kowert, Hood, Munyon, Rankin & Goetzel, PC

(57) ABSTRACT

Systems, apparatuses, and methods for notification support in extended discontinuous reception mode. A base station and UE may configure eDRX communication. An indication may be received during the eDRX communication. The network may cache the indication. The network may modify the DRX configuration. The network may use a wake up signal. In response, the UE may receive the indication while achieving power savings from the eDRX configuration.

20 Claims, 18 Drawing Sheets

NOTIFICATION SUPPORT IN EXTENDED DISCONTINUOUS RECEPTION MODE

PRIORITY INFORMATION

This application claims benefit of priority of Chinese patent application Serial No. 201910746188.7 titled "Notification Support in Extended Discontinuous Reception Mode" filed Aug. 19, 2019, which is hereby incorporated by reference in its entirety as though fully and completely set forth herein.

TECHNICAL FIELD

The present application relates to wireless communication, including to techniques for wireless device notification support in extended discontinuous reception (eDRX) mode.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for a notification support in extended discontinuous reception (eDRX) mode.

A base station and UE may configure eDRX communication. A notification (e.g., emergency message broadcast) may be transmitted during the eDRX communication. The network may cache the notification and/or the actual message payload. The network may modify the DRX configuration. The network may use a wake up signal. In response, the UE may receive the indication while achieving power savings from the eDRX configuration.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
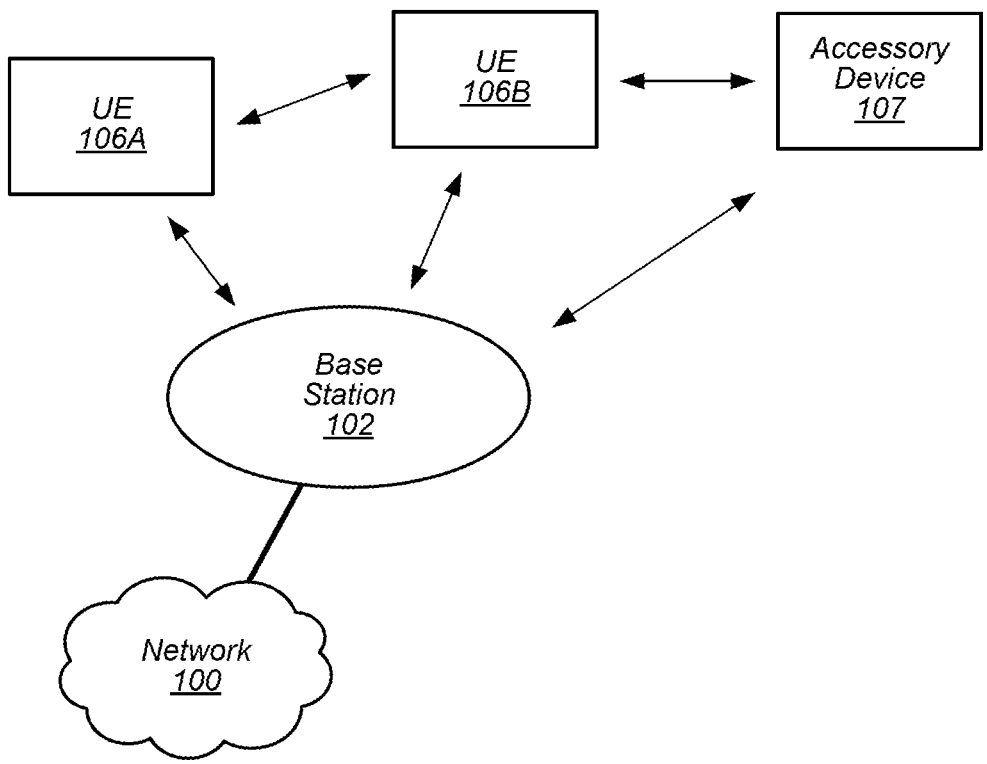
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present Patent Application:
UE: User Equipment
BS: Base Station
eNB: eNodeB (LTE Base Station)
gNB: gNodeB (NR Base Station)
LTE: Long Term Evolution
UMTS: Universal Mobile Telecommunications System
NR: 5G New Radio
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
iDRX: Idle/Inactive Mode Discontinuous Reception
eDRX: extended Discontinuous Reception
SIB: System Information Block

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as a smart watch), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific integrated Circuit), programmable hardware elements such as a field programmable gate array (FPGA), as well any of various combinations of the above.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at leak includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
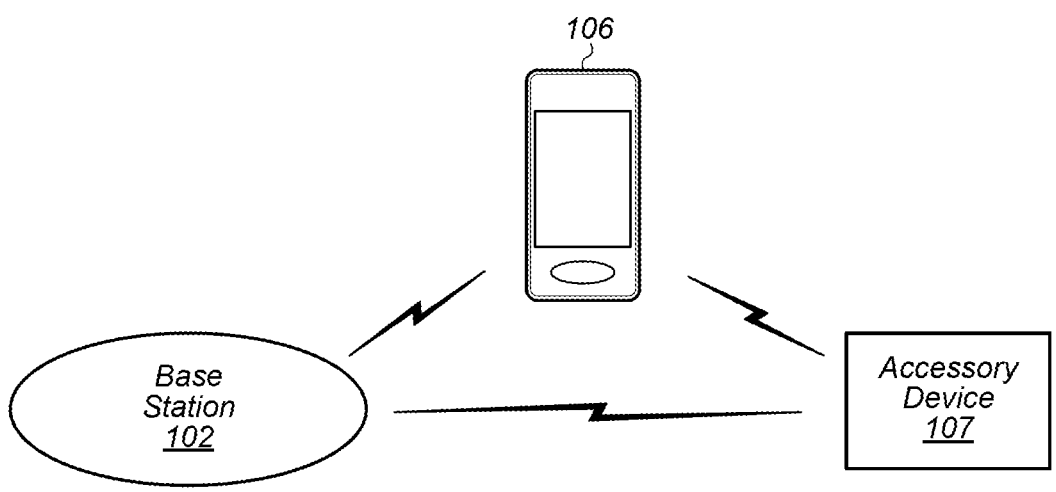
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may he capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, the UE 106A and UE 106B may be capable of arranging and performing D2D communication (e.g., including D2D discovery communications) with each other even when out-of-coverage of the BS 102 and other cellular base stations.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of its companion device (e.g., UE 106B) to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may include cellular communication capability and be capable of directly communicating with the base station 102 as shown. When the accessory device 107 is configured to directly communicate with the base station, the accessory device may be said to be in "stand alone mode."

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (e.g., processor elements) and various hardware components as described herein. The UE 106 and/or 107 (e.g., using associated processors) may perform any of the method embodiments described herein by executing instructions on one or more processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies (e.g., including any combination of CDMA, GSM, UMTS, LTE, 5G NR, and/or Wi-Fi, among others). In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

In some embodiments, the UE 106 and/or UE 107 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 (and/or 107) and/or BS 102 may be configured to apply different "weight" to different antennas. The process of applying these different weights may be referred to as "precoding".

In some embodiments, the UE 106 and/or UE 107 may include separate transmit and/or receive chains (e.g., including separate antennas and other radio components) for each wireless communication protocol with which it is configured to communicate. As a further possibility, the UE 106 and/or UE 107 may include one or more radios which are shared between multiple wireless communication protocols, and one or more radios which are used exclusively by a single wireless communication protocol. For example, the UE 106 and/or UE 107 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
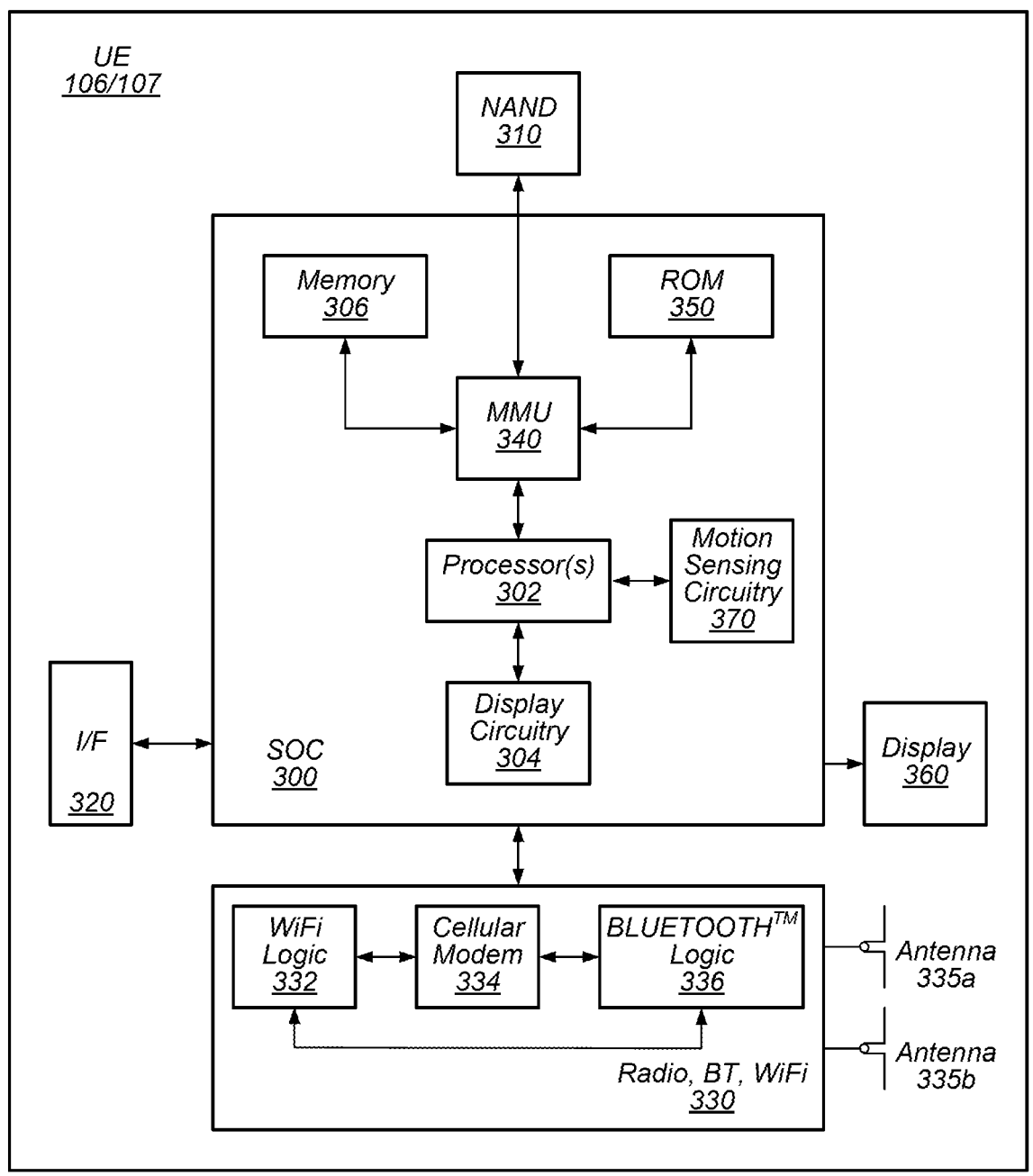
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
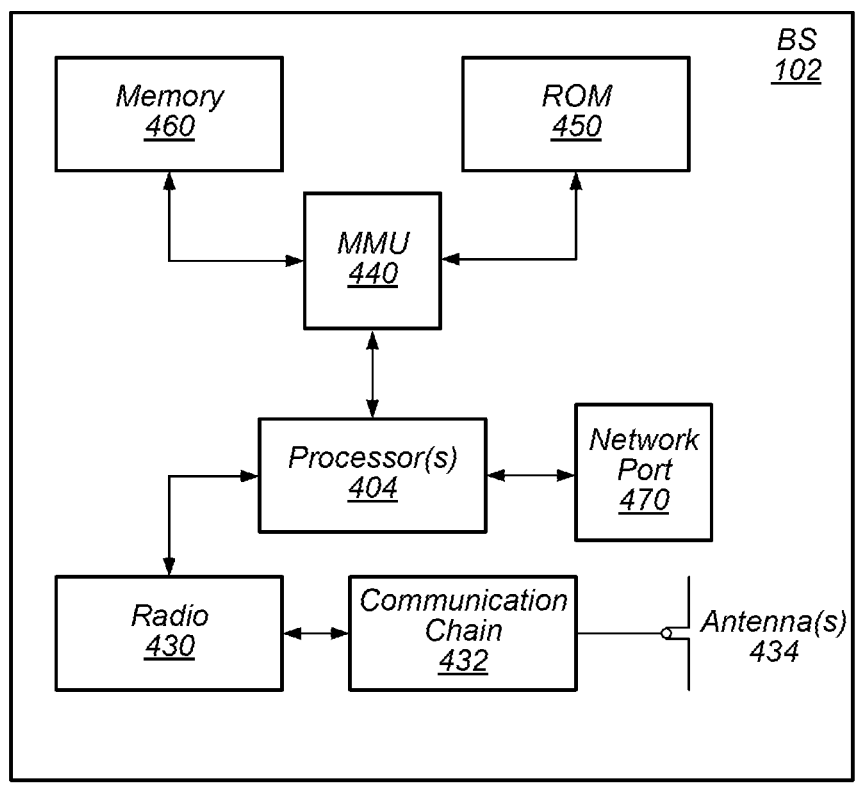
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102. may be capable of operating as both an LTE base station and a Wi-Fi access point. As another possibility, the base station 102 may include a multi-mode radio which is capable of performing communications according to any of multiple wireless communication technologies (e.g., any combination of CDMA, GSM, UMTS, LTE, 5G NR, and/or Wi-Fi among others).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements, Thus, processor(s) 404 may include one or more integrated circuits (ICs) that are configured to perform the functions of processor(s) 404. In addition, each integrated circuit may include circuitry (e.g., first circuitry, second circuitry, etc) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
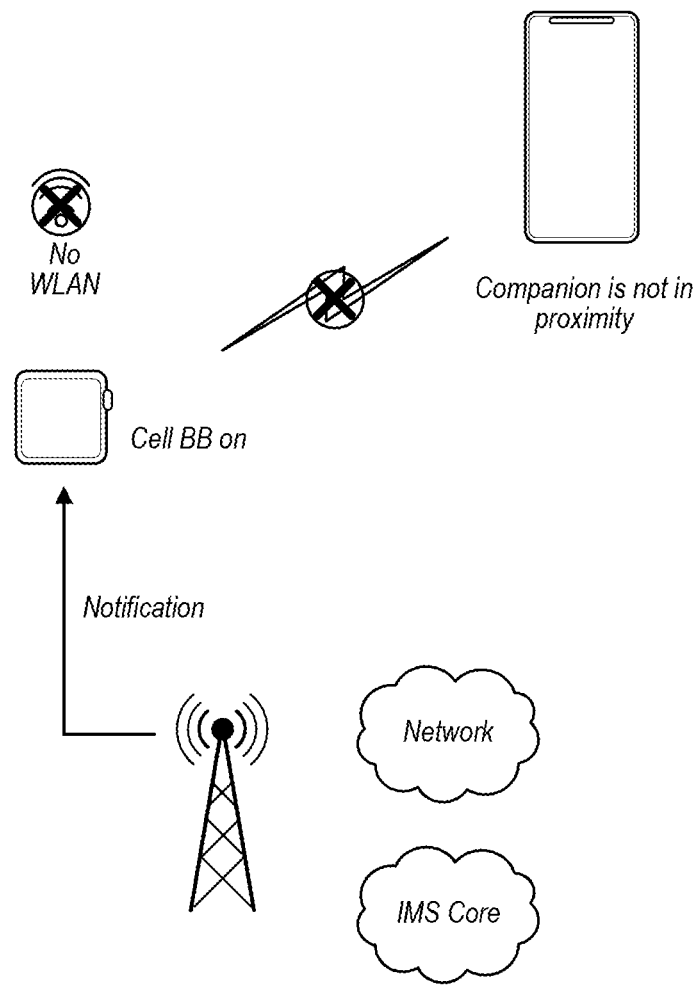
FIG. 5 illustrates an exemplary accessory device receiving a notification while operating in stand alone mode, according to some embodiments.
Figure 6:
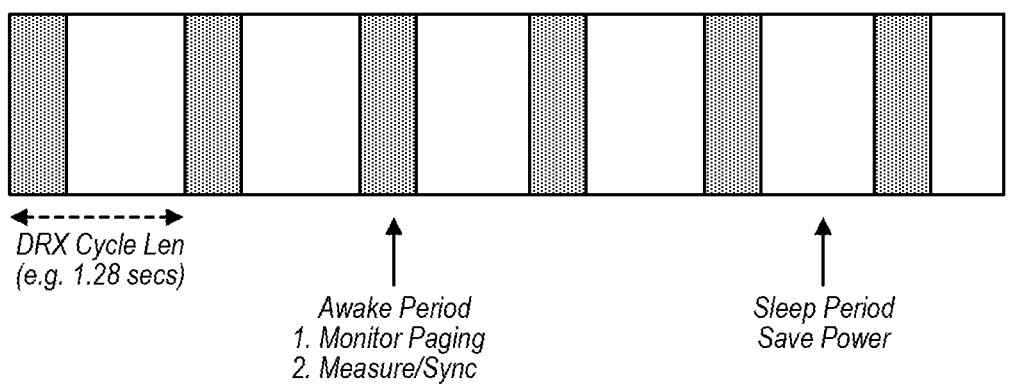
FIG. 6 illustrates an exemplary idle/inactive DRX (iDRX) configuration, according to some embodiments.
Figure 7:
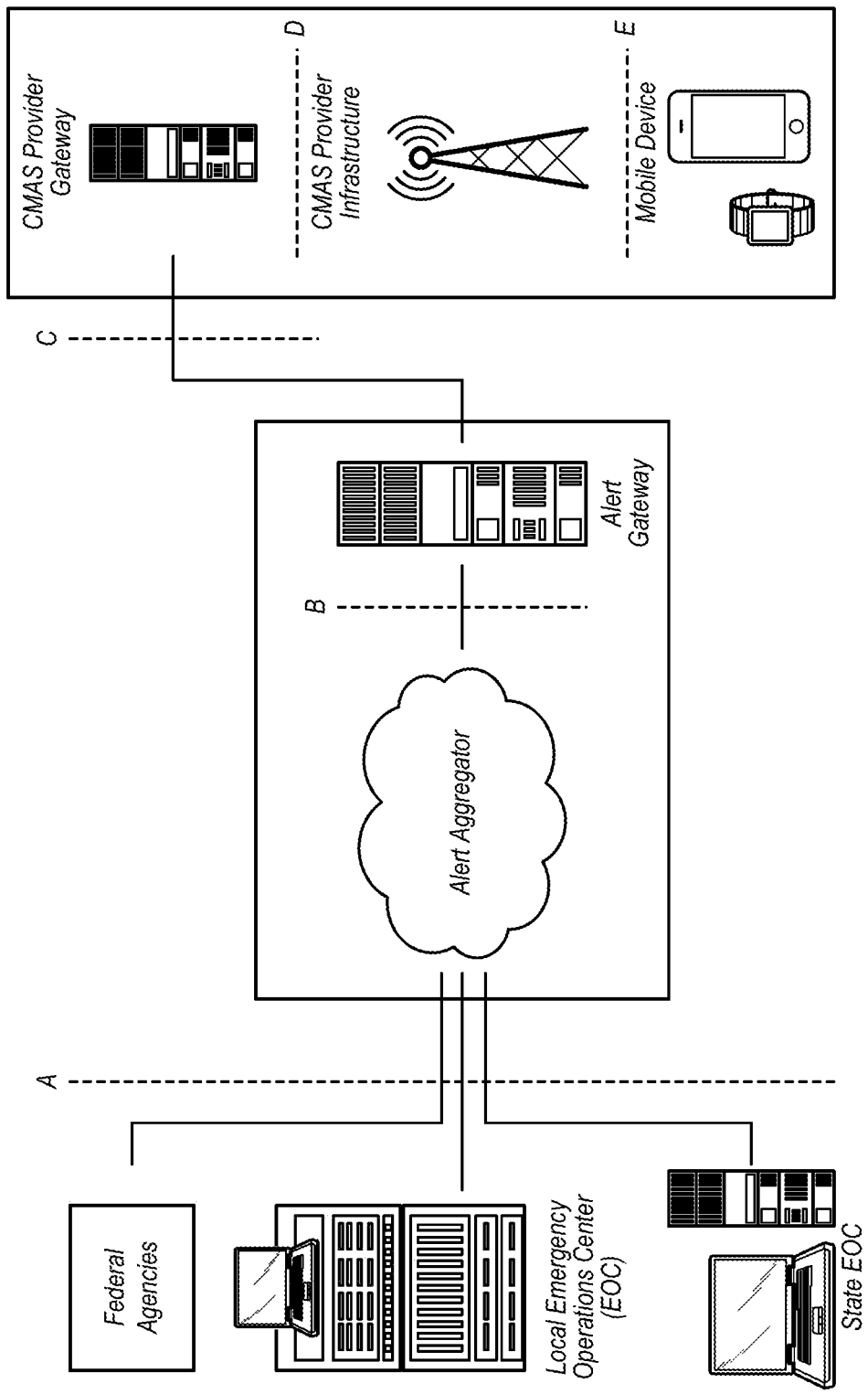
FIG. 7 illustrates an exemplary emergency message system, according to some embodiments.

FIGS. 5-7—Notifications and DRX Cycle

An accessory device, or link budget limited device, may operate in a "relay mode" with a corresponding companion device to communicate with a base station (as noted above) or may operate in a "stand alone" mode, where the accessory device communicates with the base station using its cellular modem.

As shown in FIG. 5, an accessory device, such as a smart watch, may operate in the stand alone mode and communicate with the network as a regular UE in RRC_IDLE, RRC_INACTIVE and RRC_CONNECTED modes when it is not connected to WLAN or in proximity of its companion device (such as a cell phone).

As noted above, an accessory device may have a small form factor and may correspondingly use a small battery. In some embodiments, the battery may be shared by both application and baseband processors, as well as the display and other sensors (e.g., such as a heart rate monitor).

As shown in FIG. 6, while in RRC_IDLE and/or in RRC_INACTIVE, the baseband modem (or more generally, the wireless circuitry, processor, and/or accessory device) may wake up at the DRX Cycle, e.g., as specified in a system information block (e.g., SIB2), to monitor the paging channel to receive mobile terminated voice/data calls. In the exemplary cycle of FIG. 6 a DRX cycle length of 1.28 seconds is shown, having DRX on durations (shown in grey) for monitoring paging, performing measurements, performing synchronization, etc. and DRX off durations (shown in white) for sleeping and saving power.

In addition, as shown in FIG. 5, the network and/or IMS core (e.g., via the base station) may also transmit notifications or broadcast messages. One example of such notifications or broadcast messages are emergency messages, such as commercial mobile alert system (CMAS) messages, wireless emergency alerts (WEA), earthquake and tsunami warning system (ETWS) messages, public warning system (PWS) messages, etc.

FIG. 7 illustrates an example system for providing emergency messages. As shown the messages may be initially generated by federal agencies, local emergency operations center (EOC), or state EOC (among others), which may be transmitted to or received by an alert aggregator. The alert aggregator may provide the messages to the alert gateway, which may in turn provide messages to the CMAS provider gateway, which may transmit the messages to mobile devices via the CMAS provider infrastructure (e.g., base stations or other network devices).

Such indications may be sent by the network and/or base station as part of the paging message. The baseband modem may also perform measurements during this on duration. The modem may spend the rest of the cycle in sleep mode (e.g., during the off duration), thereby saving battery power.

Note that the following sections, while described primarily with respect to "accessory devices" or "link budget limited devices" or "MTC devices", may also apply to typical UE devices, such as cell phones, among other types of devices.

Figure 8:
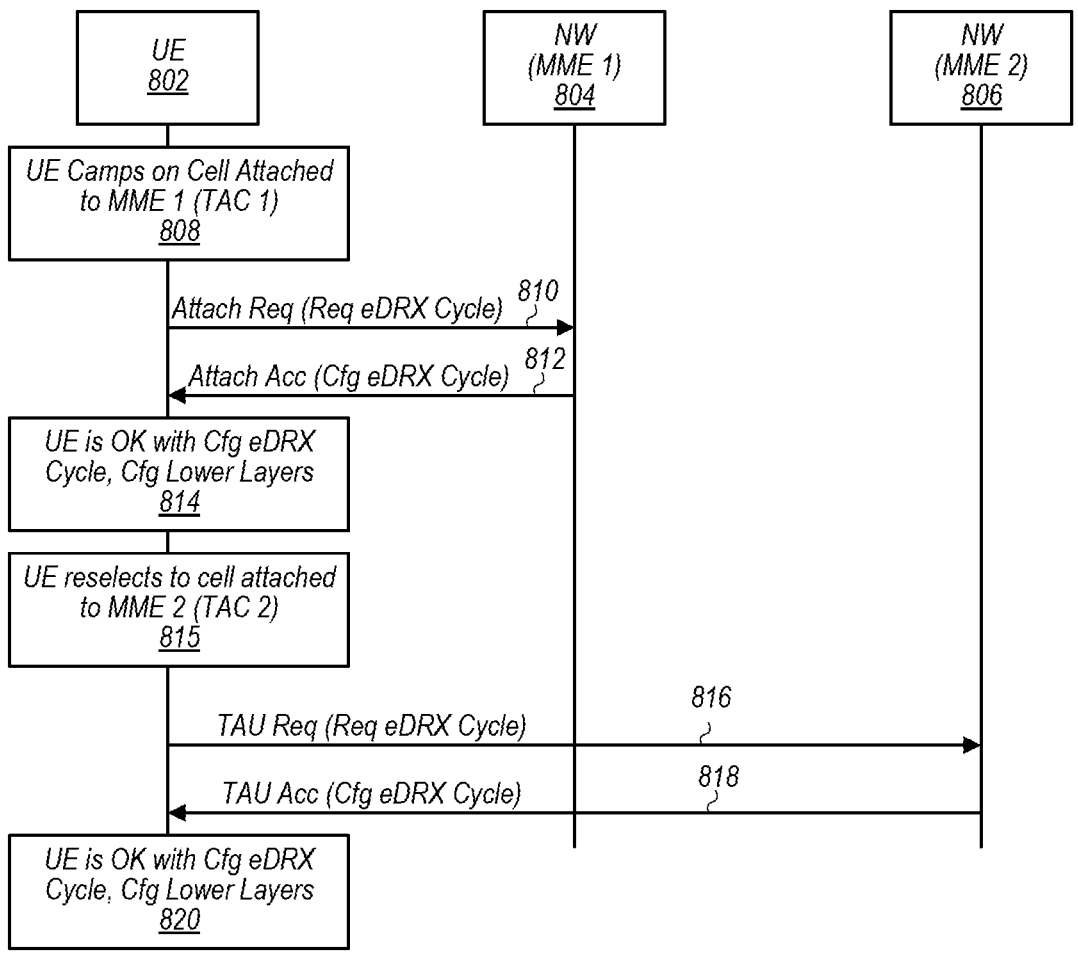
FIG. 8 is a message flow diagram illustrating an exemplary method for extended DRX (eDRX) configuration, according to some embodiments.

FIG. 8—Extended DRX

Extended DRX (eDRX) is a power-saving feature intended for machine-type communication (MTC) type devices to allow UEs to sleep longer and monitor paging channel sparsely as compared to a UE that uses normal Idle/Inactive Mode DRX (iDRX) (e.g., does not have eDRX configured). For example, a typical cycle length for iDRX may be 1.28 seconds, whereas eDRX may be configured anywhere from 5.12 seconds to greater than 44 minutes, depending on the implementation and/or configuration. Using the longer eDRX cycle length may offer significant battery savings compared to a typical DRX cycle length, particularly for link-budget limited (e.g., accessory) devices.

As part of the feature, the accessory device, e.g., on power-up or attach or registration (and potentially at subsequent registration update/tracking area update (TAU)/routing area update (RAU) procedures, may request a UE-specific eDRX cycle length or configuration. If the network (e.g., the 5GCN/EPS) supports the feature, it may indicate an eDRX cycle length or configuration in the response message (e.g., within an attach accept, registration accept, TAU Accept, RAU Accept, or other type of message). In some embodiments, the network may indicate a value or configuration of eDRX that is different from the UE requested value in its response message. Alternatively, the network may skip any indication for an eDRX cycle in response message, if it does not want to configure eDRX. In this case, the accessory device may not apply any eDRX operation, and use only regular DRX mode of operation.

FIG. 8 illustrates an exemplary procedure for negotiating and using eDRX. As shown a UE 802 initially camps on a cell attached to a first network 804, at 808. The UE may transmit an attach request that requests a preferred eDRX cycle in 810. In response, the first network may transmit an attach accept message that configures the eDRX cycle in 812. In 814, the UE uses the eDRX cycle and configures its lower layers. This procedure is repeated periodically or when the UE 802 switches to a new MME/network 806 (e.g., during Cell Reselection Procedure) at 815, using TAU requests and TAU accepts in 816, 818, and 820.

Accordingly, a UE that has negotiated eDRX may be able to sleep for longer durations while monitoring paging channel for mobile terminated notifications and calls, y saving precious battery in power budget limited cellular devices.

Figure 9:
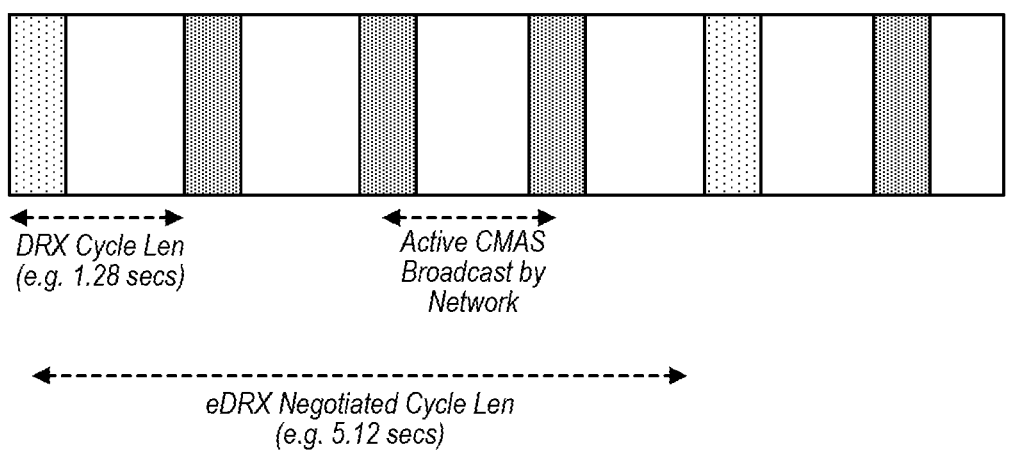
FIG. 9 illustrates an exemplary eDRX configuration, according to some embodiments.

However, as shown in FIG. 9, the shortest eDRX length that can be negotiated currently is 5.12 secs, but some notifications (e.g., CMAS/ETWS/PWS messages) may need to be delivered to the accessory device at a faster cadence. Said another way, eDRX may be a UE specific page monitoring and sleep pattern, but certain notifications (e.g., CMAS messages) may be sent at eNB/gNB cell-specific level iDRX cycle. Hence, as shown in FIG. 9, the accessory device may be in sleep mode while such notifications are broadcasted by the cell and may potentially miss the reception of the notification(s) if it wakes up at eDRX configured cycles to monitor paging.

In FIG. 9, the UE may have an eDRX cycle length of 5.12 seconds, and hence may only be on during the white shaded regions, while the notification(s) (shown in this Figure as a CMAS message) may be broadcasted by the network during the normal idle DRX (iDRX) on durations which have a period of 1.28 seconds (all shaded regions). Thus, it is possible that the accessory device may completely miss the broadcasted indications.

Accordingly, various embodiments may provide mechanisms for allowing the accessory device to receive these messages, thereby allowing devices to enjoy the power benefits of being in eDRX without compromising its ability to receive these indications. Note that in all of the following sections, while various descriptions may refer to specific types of UEs or network devices, specific cellular standards, and specific messages, these embodiments are intended to cover any desired type of UE of network devices, any current or future cellular standard, and any type of message (e.g., including indications or broadcasts that are different than the described emergency messages).

Figure 10:
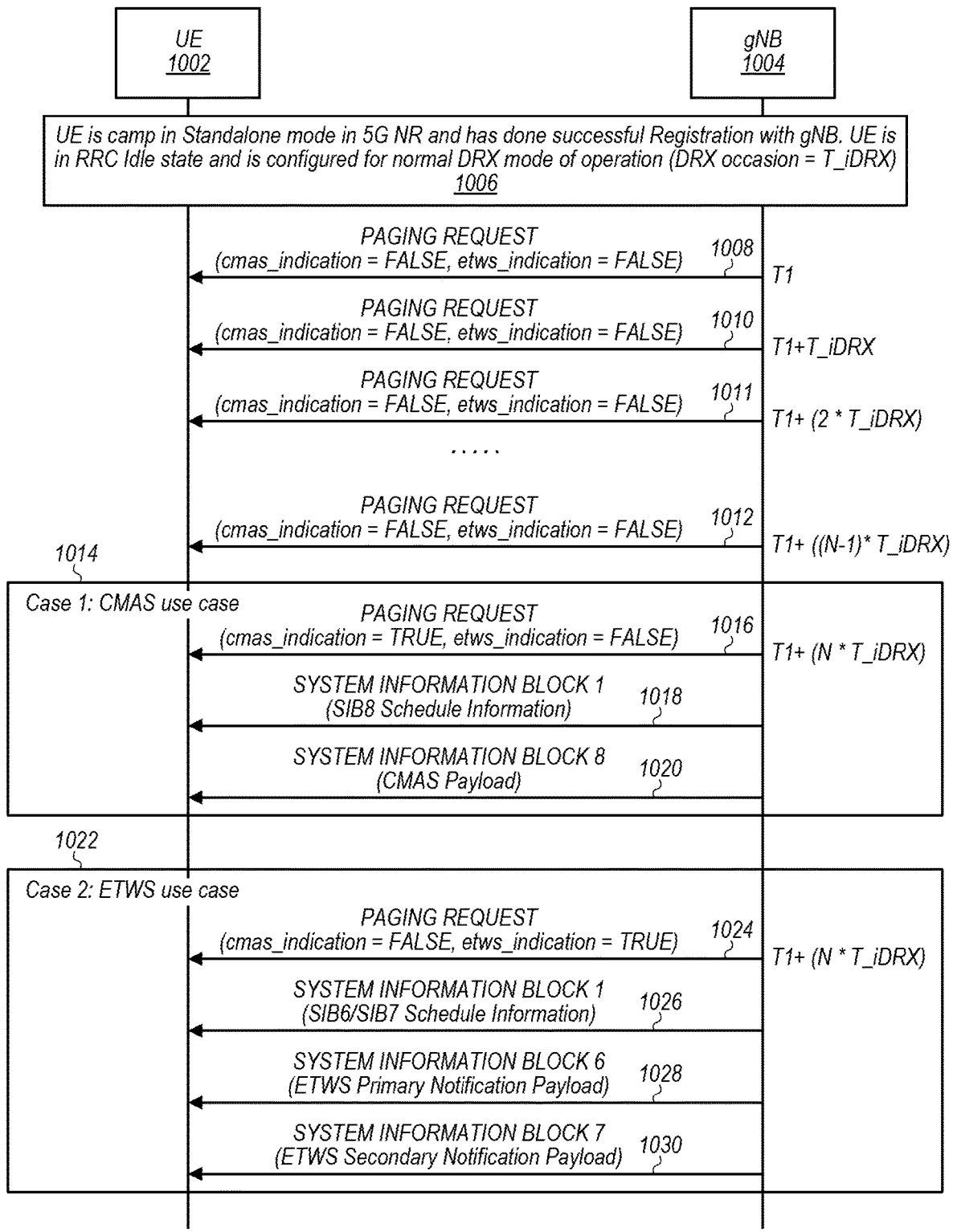
FIG. 10 illustrates a message flow diagram for receiving emergency messages using an iDRX configuration, according to some embodiments.
Figure 11:
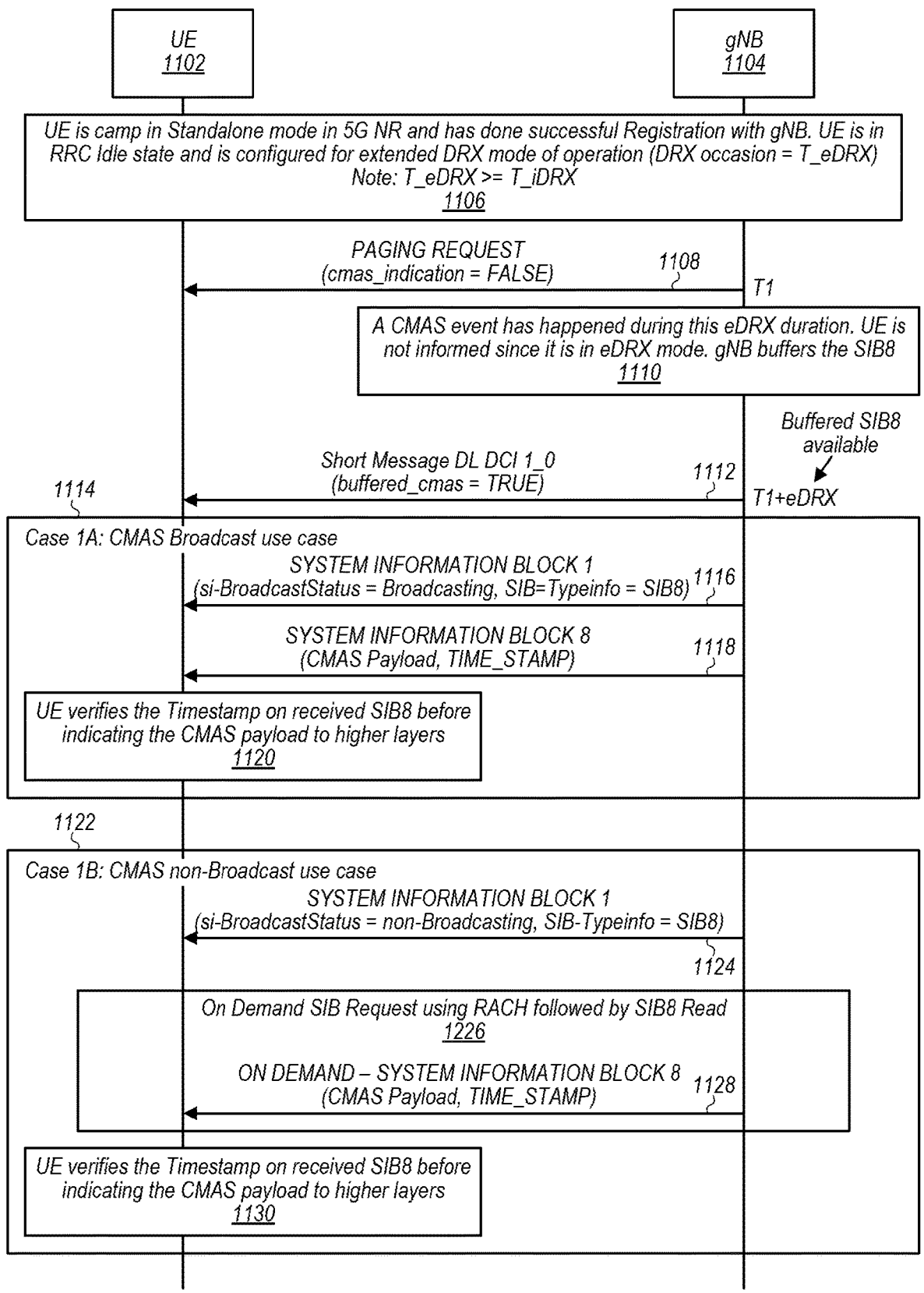
FIG. 11 illustrates a message flow diagram for receiving a cached CMAS message with an initial eDRX configuration, according to some embodiments.
Figure 12:
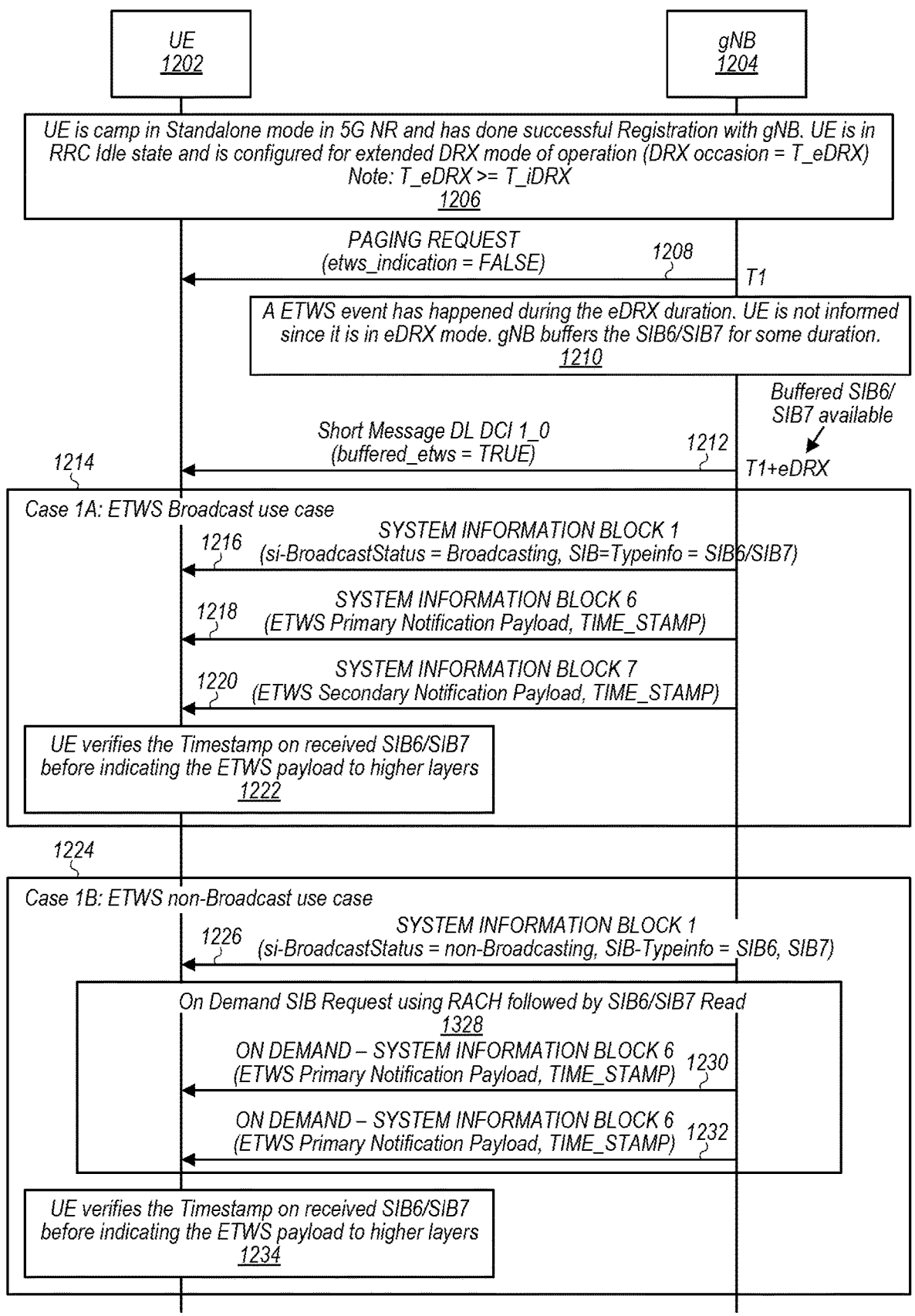
FIG. 12 illustrates a message flow diagram for receiving a cached ETWS message with an initial eDRX configuration, according to some embodiments.

FIGS. 10-12—Caching On Demand Retrieval of Indications

In 5G NR, the gNB is expected to broadcast CMAS and/or ETWS (e.g., within SIB 6, SIB7, and/or SIB8 on a cell specific DRX Cycle (e.g., 1.28 sec). In one embodiment, apart from this regular broadcast of CMAS/ETWS SIBs, the gNB could cache those specific SIBs.

Note that the maximum caching duration may be dependent on various factors including but not limited to any potential expiration duration configured by the cell broadcast center (CBC), any internal implementation timer based on the gNB memory/resource constraints, etc. For example, in one embodiment, the cache period may be for a small duration that is allowed based on configuration from the access and mobility management function (AMF) and/or CBC, e.g., 10.24 sec. Additionally, in some embodiments, any new CMAS/ETWS broadcast from CBC may overwrite the previously cached SIB content.

Accordingly, if cached SIBS (e.g., which may include the messages) are available at eDRX paging occasions, the base station may indicate them to the UE. For example, the gNB may indicate these cached SIBs using "Short Message" via DCI (e.g., DL DCI Format 1_0) that a cached SIB (e.g., SIB 6/7/8) is available to inform any UEs in eDRX mode of operation that there was a CMAS/ETWS broadcast event while the UE was in sleep mode. On receipt of this indication (e.g., the "Short Message" DCI) indicating cached CMAS/ETWS message, the UE may read SIB1 on reception of that indication (e.g., immediately). Based on the si-BroadcastStatus e.g., indicated in the SIB1 for the cached SIBs (e.g., SIB 6/7/8), the UE may proceed to decode the broadcasted. CMAS/ETWS SIBs from the cell. Alternatively or additionally, it can request for those SIBs via the on-demand procedure.

In some embodiments, each of the cached SIBs (e.g., SIB 6/7/8) may be timestamped with an origin/expiry time (e.g., in UTC). On reception of the SIB, the UE may compare the current time with the expiry timestamp. Accordingly, if the SIB timestamp is in the past, the UE may choose to drop that received SIB, e.g., based on its internal implementation, which may prevent any false CMAS/ETWS UI display trigger based on outdated broadcast messages.

Similarly, once the SIB timestamp has expired, the network may choose to continue broadcast for an extended duration or may choose to delete the cached CMAS/ETWS messages as per its internal implementation.

These embodiments may provide several benefits. For example, wearable and other cellular devices with limited power budgets may be able to make use of the eDRX power saving feature without a lot of compromise on receiving indications (e.g., emergency messages). Additionally, the network may continue to be able to support such indications (e.g., emergency messages) at cell specific DRX cycles that are followed by a vast majority of the devices in that cell (thereby, no latency regression for devices like smartphones that may not have power budget limitations).

FIG. 10 illustrates CMAS and ETWS cases for devices using a typical iDRX cycle length. In the example shown, the UE 1002 is in communication with gNB 1004. In 1006, the UE is camped in stand alone mode in 5G NR and has done successful registration with the gNB. The UE may be in RRC idle and/or RRC inactive state and is configured for normal DRX mode of operation (DRX occasion/cycle length=T_iDRX). At 1008, the gNB may transmit a paging request at T1, without any CMAS or ETWS indication. This may be repeated each cycle from 1010-1012.

At 1014 (showing an exemplary CMAS case), the UE may receive a paging request with a CMAS indication set to TRUE. Accordingly, the UE may decode SIB1 and retrieve SIB8 schedule information at 1018 and then receive the SIB8 (including the CMAS payload) at 1020.

At 1022 (showing an exemplary ETWS case) the UE may receive a paging request with a ETWS indication set to TRUE. Accordingly, the UE may decode SIB1 and retrieve SIB6 and SIB7 schedule information at 1026 and then receive the SIB6 (including the ETWS primary notification payload) at 1028 as well as SIB7 (including the ETWS secondary notification payload) at 1030.

FIG. 11 illustrates CMAS cases for devices using an eDRX cycle length. In the example shown, the UE 1102 is in communication with the gNB 1104. In 1106, the UE is camped in stand alone mode in 5G NR and has done successful registration with the gNB. Additionally, the UE may be in RRC idle and/or RRC inactive state and may be configured for eDRX mode of operation (DRX occasion/cycle length=T_eDRX, which is greater than T_iDRX).

In 1108, the UE may receive a paging request without a CMAS indication. In 1110, a CMAS event happens while the UE is asleep. The gNB buffers SIB8. In 1112, the gNB transmits an indication (short message DL DCI 1_0) indicating a buffered CMAS exists at the next eDRX cycle.

1114 shows the CMAS broadcast use case. In 1116, the UE receives SIB1, which indicates schedule information for the cached SIB8. Accordingly, in 1118, the UE receives SIB8 with a timestamp value. In 1120, the UE may verify the timestamp on received SIB8 before indicating the CMAS payload to higher layers (e.g., for display to the user of the UE).

1122 shows the CMAS non-broadcast use case. In 1124, the UE receives the SIB1 from the network, indicating that the cached SIB8 is not going to be broadcast (unlike 1116) as well as the cached SIB (SIB8). In 1126, the UE requests the SIB8 using a RACH based on demand SIB request. Accordingly, in 1128, the UE receives SIB8 and in 1130 verifies the timestamp, similar to 1120.

FIG. 12 illustrates ETWS cases for devices using an eDRX cycle length. In the example shown, the UE 1202 is in communication with the gNB 1204. In 1206, the UE is camped in stand alone mode in 5G NR and has done successful registration with the gNB. Additionally, the UE may be in RRC idle and/or RRC inactive state and may be configured for eDRX mode of operation (DRX occasion/cycle length=T_eDRX, which is greater than T_iDRX).

In 1208, the UE may receive a paging request without an ETWS indication. In 1210, an ETWS event happens while the UE is asleep. The gNB buffers SIB6 and SIB 7. In 1212, the gNB transmits an indication (short message DL DCI 1_0) indicating a buffered ETWS exists at the next eDRX cycle.

1214 shows the ETWS broadcast use case. In 1216, the UE receives SIB1, which indicates schedule information for the cached SIB6 and SIB7. Accordingly, in 1218 and 1220, the UE receives SIBs 6 and 7 (having primary and secondary ETWS payloads) with timestamp values. In 1222, the UE may verify the timestamp on the received SIB6 and SIB7 before indicating the ETWS payload to higher layers (e.g., for display to the user of the UE).

1224 shows the ETWS non-broadcast use case. In 1226, the UE receives the SIB1 from the network, indicating that the cached SIB6 and SIB7 are not going to be broadcast (unlike 1216) as well as the cached SIB (SIB8). In 1228, the UE requests the SIBs 6 and 7 using a RACH based on demand SIB request. Accordingly, in 1230 and 1232, the UE receives SIBs 6 and 7 and in 1234 verifies the timestamps, similar to 1222.

Figure 13:
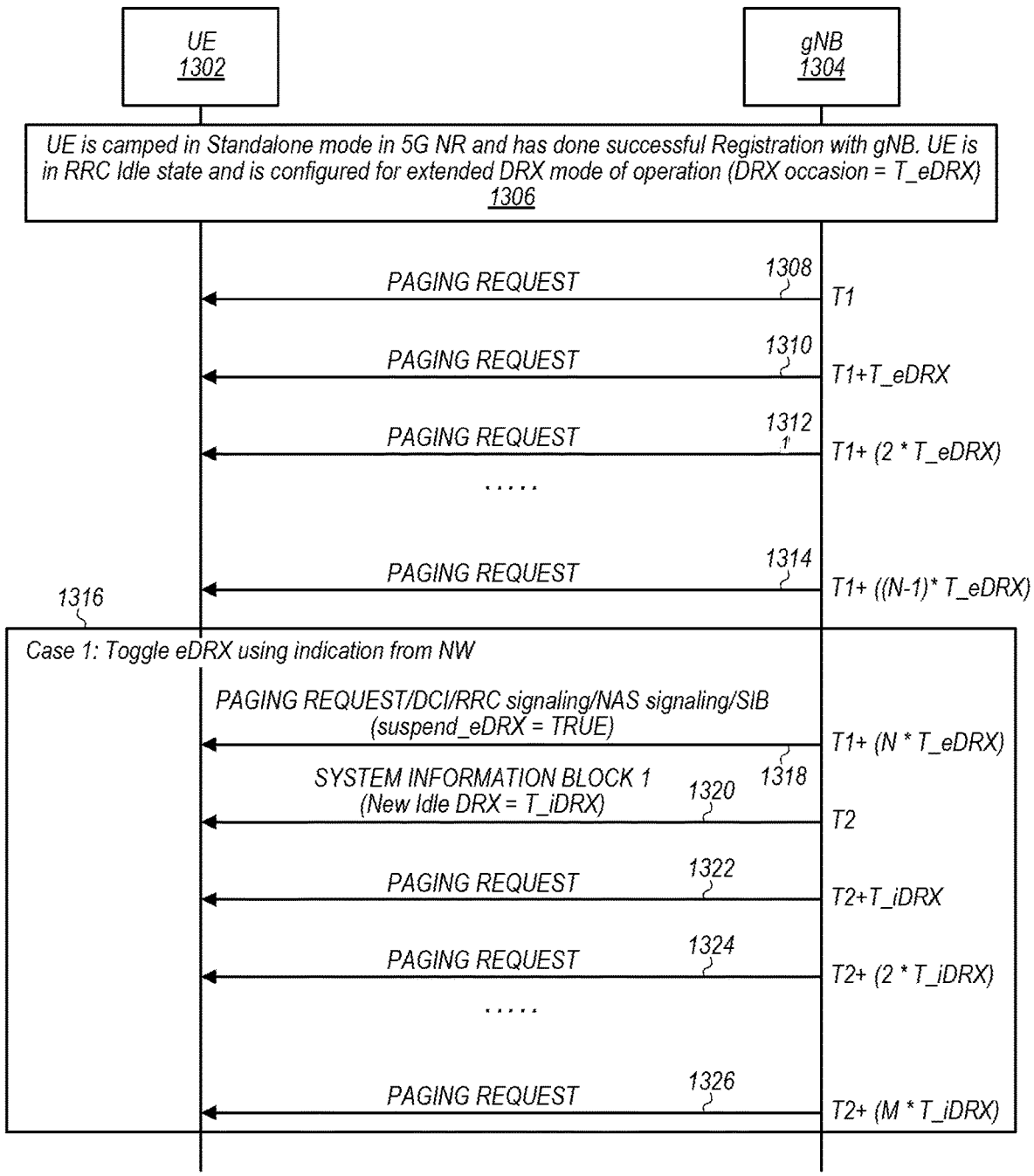
FIG. 13 illustrates a message flow diagram for modifying an eDRX configuration to an iDRX configuration, according to some embodiments.
Figure 14:
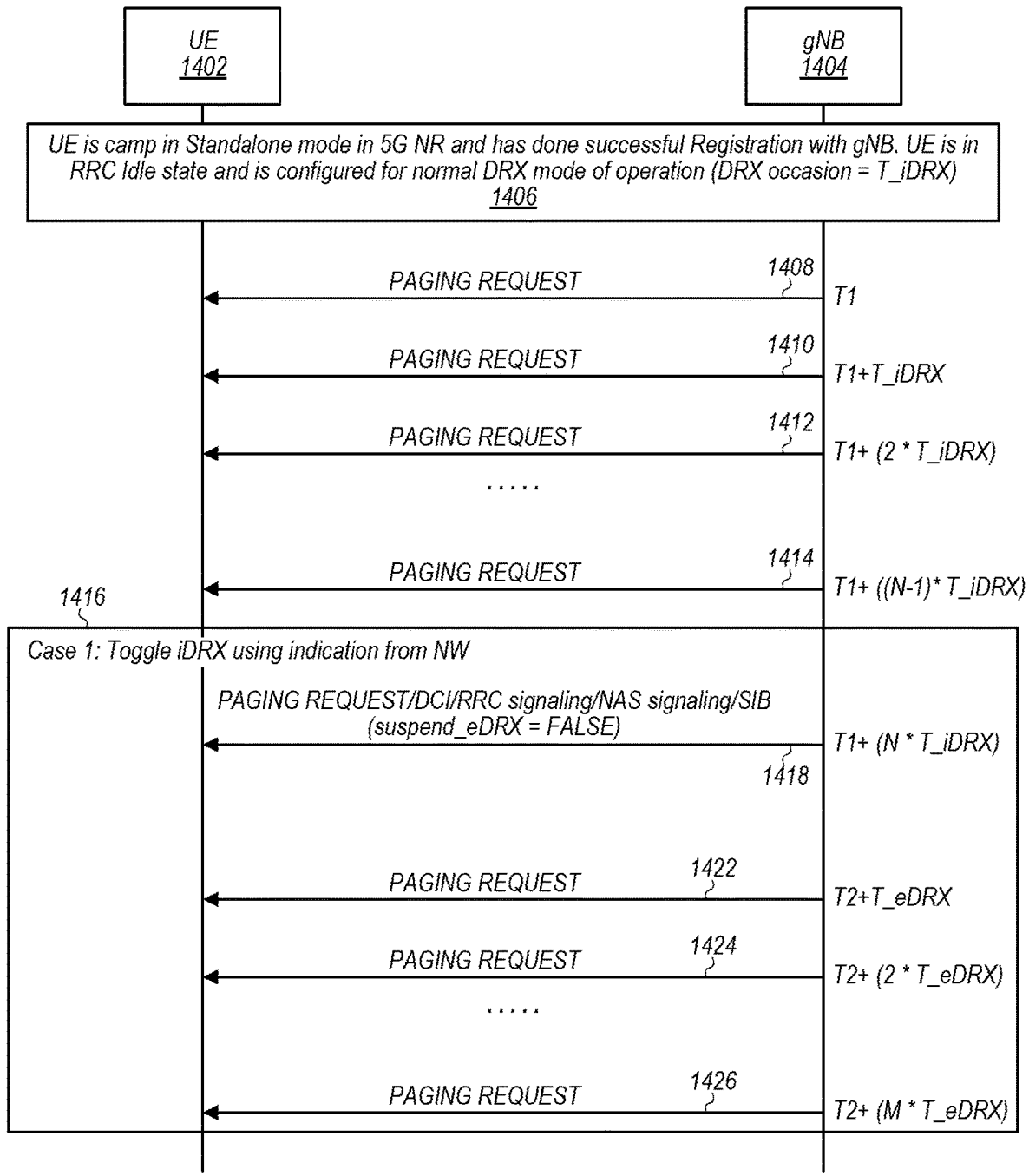
FIG. 14 illustrates a message flow diagram for modifying an iDRX configuration to an eDRX configuration, according to some embodiments.

FIGS. 13 and 14—Adaptive eDRX-iDRX Toggle

As noted above, a UE may negotiate an eDRX cycle with the network (e.g., AMF and/or MME) as part of the Registration, Attach, TAU, and/or RAU procedures (among others).

In some embodiments, if during the time at which the UE is in eDRX mode of operation and an indication (e.g., emergency message) becomes active, the network may be able to send a signal to the UE to reconfigure idle mode DRX for indication reception using the cell-specific DRX configuration.

According to various embodiments, this signal may one or more of: a dedicated physical reference signal transmitted by the network at a configured RB with the command to suspend eDRX; a DCI Message to the UE (or group of UEs) to temporarily suspend eDRX; a MAC-CE; an RRC paging message with a cause code indicating temporary eDRX suspension; a paging message with a specific cause code that may force the UE to read SIB1 immediately, which may include a parameter that indicates that cell specific DRX cycle should override any eDRX configuration while SIB1 has that flag set; a paging message with a specific cause code that may force the UE to read SIB1 and the UE may temporarily disable eDRX until CMAS/ETWS SIBS are no longer being broadcasted based on the scheduling information included in SIB1; a dedicated RRC/NAS Signaling indicating temporary suspension of eDRX; and/or other signals.

The base station may use a similar mechanism (as above) to resume eDRX quickly without the exchange of a lot of signaling messages between the UE and the network, to ensure that the UE is able to derive the power benefits of eDRX as soon as possible.

In this embodiment, the base station/network may retain full control of quickly switching the UE between eDRX and cell specific DRX Cycles without compromising on UE Power saving. This embodiment may help with emergency message support in eDRX mode. This would lead to use of this power saving feature for wearable types of devices which need to listen to emergency messages for regulatory and other reasons.

However, while emergency messages are just one of the trigger reasons for network to deploy adaptive eDRX, it can also be used for other reasons, e.g., based on its internal implementation.

For example, the network may adaptively or dynamically switch one or more UEs between eDRX and iDRX cycles based on congestion or temporary scheduling constraints. For example, if the network is unable to cope with temporary congestion events such as stadium events, emergency events, etc. where there may be concerns if the network can successfully page UEs with limited eDRX opportunities, the network may choose to temporarily disable eDRX at the network, e.g., using light weight mechanisms rather than via dedicated signaling between the network and all eDRX activated UEs in its coverage.

As another example, the network may use one or more of the described embodiments when there is a need to enhance latency. For example, if a UE is receiving a lot of MT data calls while it is the eDRX sleep cycle, the network may choose to move the UE to the cell-specific iDRX cycle to avoid buffering/dropping data within the core network or at the base station. As an example, if the base station or UPF is receiving a lot of downlink data for the UE in eDRX, e.g., from a certain low latency network slice, it may choose to disable eDRX temporarily for that UE.

A similar approach is also possible in cases UE with sparse DL data might be moved to eDRX mode of operation (assuming UE capability supports it) from the current iDRX mode of operation.

Thus while in legacy systems, eDRX configuration can be initiated and/or requested for modification only by UE initiated signaling, in various embodiments, the network may also have a way to initiate the switch between eDRX and iDRX per requirements that are visible and/or proprietary to the network.

FIG. 13 illustrates an exemplary modification of eDRX to iDRX. As shown the UE 1302 may be in communication with the gNB 1304. In 1306, the UE is camped in stand alone mode in 5G NR and has done successful registration with gNB. The UE is in RRC idle state and is configured for eDRX mode with a DRX occasion/cycle length of T_eDRX.

In 1308-1314, the UE 1302 may receive paging requests from the gNB 1304 at each eDRX cycle. In 1316, the case for eDRX toggling is shown. At 1318, the UE 1302 may receive a suspend eDRX signal. At 1320, the UE 102 may receive SIB1 with an indication of a change in DRX from T_eDRX to T_iDRX. From 1322-1326, the UE 1302 may receive paging requests according to the iDRX cycle (and thereby receive messages, such as emergency messages, in a normal fashion).

FIG. 14 illustrates an exemplary modification of iDRX to eDRX. As shown the UE 1402 may be in communication with the gNB 1404. In 1406, the UE is camped in stand alone mode in 5G NR and has done successful registration with gNB. The UE is in RRC idle state and is configured for iDRX mode with a DRX occasion/cycle length of T_iDRX. In this example, the UE was previously configured for eDRX, but was temporarily configured for iDRX based on FIG. 13.

In 1408-1414, the UE 1402 may receive paging requests from the gNB 1404 at each iDRX cycle. In 1416, the case for iDRX toggling is shown. At 1418, the UE 1402 may receive a suspend eDRX signal with the value set to FALSE (rather than TRUE from FIG. 13). From 1422-1426, the UE 1402 may receive paging requests according to the eDRX cycle.

Figure 15:
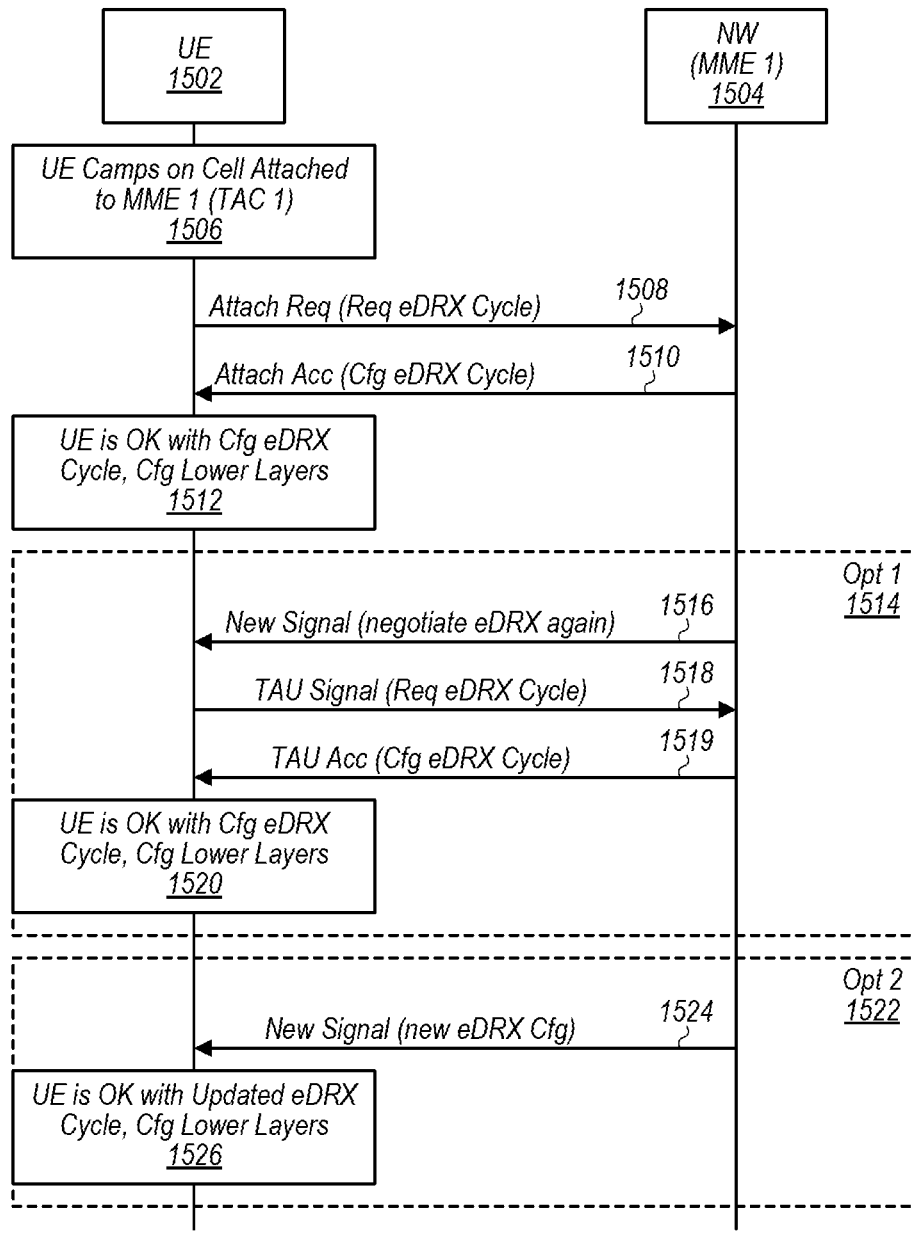
FIG. 15 illustrates a message flow diagram for network-initiated modification of an eDRX configuration, according to some embodiments.

FIG. 15—Network Initiated Modification of eDRX Configuration

As previously discussed, the UE and network may manage the configuration of eDRX cycle length during the Registration/Attach/TAU/RAU procedures (although other mechanisms are envisioned). These procedures are initiated by the UE. Accordingly, if the UE does not initiate a new eDRX configuration negotiation, the network may be bound to the eDRX configuration once initial negotiation is completed.

In some embodiments, new signaling (e.g., at L1, L2, or L3) between the network and the UE that can be initiated by the network to re-negotiate a new eDRX configuration between the UE and the network. Alternatively, or additionally, this new NW initiated signaling may directly carry a new eDRX configuration (e.g., changing the cycle length) that is lower than the initially negotiated eDRX cycle length and the UE may be required to apply this new configuration from the next DRX cycle.

FIG. 15 illustrates this embodiment. As shown the UE 1502 may be in communication with the network 1504. In 1506, the UE may be camped on a cell attached to MME1. In 1508-1512, the UE 1502 and the network 1504 may initially configure eDRX.

1514 illustrates a network initiated reconfiguration flow. In 1516, the network may provide a signal requesting a reconfiguration of eDRX. In 1518, the UE may respond with a TAU signal requesting an eDRX re-configuration. In 1519, the network may respond with an eDRX configuration. In 1520, if the UE accepts the configuration, it may configure its lower layers according to the configuration.

1522 illustrates a network initiated modification of the eDRX configuration. In 1524, the network transmits a new eDRX configuration and in 1526 the UE may update its configuration. As noted above, in the embodiment of 1522, the network may only configure the eDRX cycle length to a lower value (e.g., by a factor of 2) to ensure the UE receives data at least as often as it was before the change.

Keep Indicating CMAS in Paging Message

Networks tend to add a paging extension cause: cmas_etws at the start (and sometimes at the end) of a period when an emergency message is actively being broadcasted in the network. However, link budget limited devices (e.g., wearables) may have a higher chance of encountering fading related page decode failures temporarily.

Accordingly, in some embodiments (e.g., for NR Lite), the network may send the paging message with the extension cause: "cmas_etws available" for all paging occasions (based off the cell specific iDRX cycle) for the entire duration when an indication (e.g., an emergency message) is actively broadcasted. Such an embodiment may help link budget limited devices by increasing their probability to receive these messages. Additionally, it may also help support reception of messages while the accessory device is in eDRX cycle mode.

Figure 16:
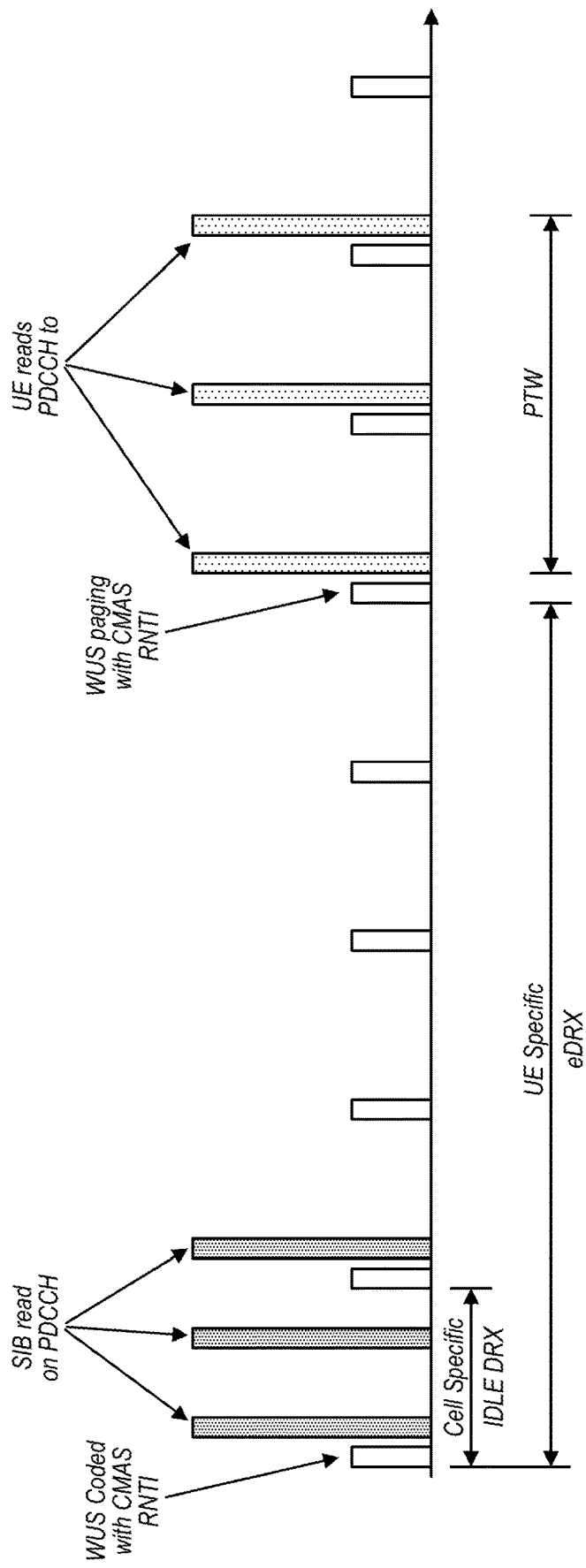
FIG. 16 illustrates exemplary use of wake up signals during eDRX, according to some embodiments.

FIG. 16—Using WUS to Avoid Delay in CMAS Reception

In some cases, the network may transmit wake up signaling (WUS) to cause a UE to receive messages. For example, the UE may include low power reception circuitry to receive the WUS, which may be used to wake the UE to receive other signals transmitted by the network.

Figure 17:
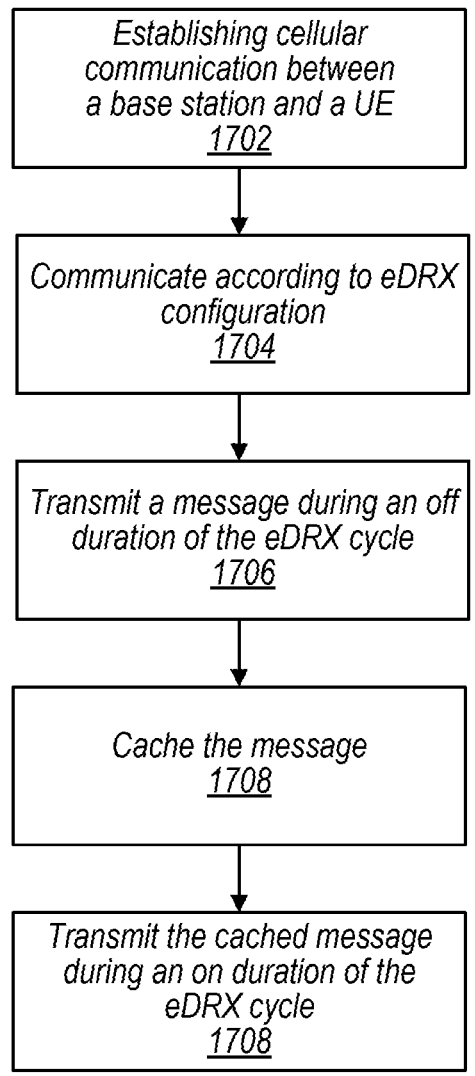
FIGS. 17-19 are flowchart diagram illustrating exemplary methods for receiving messages after being configured for eDRX, according to various embodiments.

For example, for low latency CMAS regulatory requirement, the gNB may broadcast a WUS at every cell specific DRX cycle. As shown in FIG. 17, the gNB may indicate a SIB modification due to CMAS broadcast on the WUS (using an CMAS indication RNTI). Accordingly, the UE may read the WUS at iDRX paging occasions (e.g., using the low power reception circuitry) and on reception of CMAS indication on WUS, may read SIB1 and CMAS SIBs 6/7/8 thereby eliminating any delay in reception of CMAS due to eDRX.

As also shown in FIG. 16, after the emergency message has been received, the UE may continue to monitor paging for other reason at eDRX paging occasions (and stay asleep during the remaining iDRX occasions).

WUS (e.g., for CMAS indication) can be used irrespective of eDRX cycle configuration, e.g., it can be used even when normal IDLE mode DRX is configured. Link budget limited devices such as wearables that keep the cellular baseband modem active to receive the rare CMAS messages from the network may benefit by scheduling extra sleep durations and thereby conserving precious battery for the end user by utilizing eDRX.

Thus, even with the reduced wake-up at the UE, the network and the UE may remain in sync and the UE may not miss important messages (such as emergency messages), at the cost of a slight delay (at most 1 eDRX cycle to receive the message). Additionally, other power-capable devices would suffer from no regression as network would still be scheduling messages (e.g., CMAS paging and/or PWS notifications) on the original normal cell specific iDRX cycle occasion.

FIG. 17—Cached Messages

FIG. 17 illustrates exemplary techniques for providing cached messages to a UE. Aspects of the method of FIG. 17 may be implemented by a wireless device, such as the UE(s) 106/107, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1702, the network (e.g., the base station) and the UE may establish communication and configure eDRX.

In 1704, the base station and the UE may communicate according to the eDRX configuration. For example, the UE may sleep during the off duration of the eDRX and may wake on the on duration and receive paging messages or perform other activities. The eDRX configuration may specify an eDRX cycle length.

In 1706, the base station may transmit a message during an off duration of the eDRX cycle (e.g., within the eDRX cycle). For example, the base station may broadcast a message (such as an emergency message, although other types of messages are envisioned) to a plurality of UEs during an off duration of the eDRX cycle.

In 1708, the base station may cache the message. For example, the base station may cache the message due to the fact that one or more UEs (e.g., including the UE in eDRX) were not awake to receive the message.

In 1710, the base station may transmit the cached message to the UE. For example, the base station may transmit the cached message to the UE during an on duration of the eDRX cycle. In some embodiments, transmitting the cached message to the UE includes broadcasting the cached message to a plurality of UEs.

In one embodiment, the base station may transmit an indication of the cached message to the UE during an on duration of the eDRX cycle and the transmission of the cached message to the UE may be performed in response to transmitting the indication of the cached message. Additionally, or alternatively, transmitting the cached message to the UE is performed in response to receiving a request from the UE to receive the cached message. As noted above, transmitting the cached message may include transmitting one or more system information blocks (SIBs) to the UE.

Figure 18:
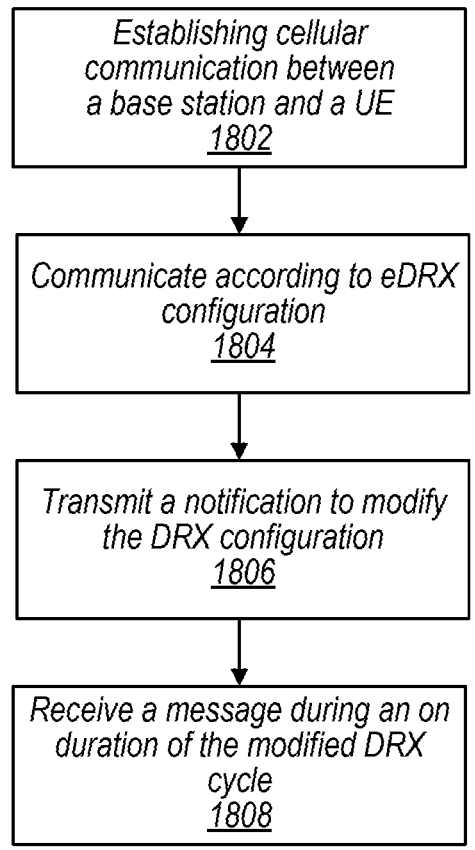

FIG. 18—Reconfiguration of DRX

FIG. 18 illustrates exemplary techniques for providing messages to a UE by reconfiguring DRX. Aspects of the method of FIG. 19 may be implemented by a wireless device, such as the UE(s) 106/107, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1802, the network (e.g., the base station) and the UE may establish communication and configure eDRX.

In 1804, the base station and the UE may communicate according to the eDRX configuration. For example, the UE may sleep during the off duration of the eDRX and may wake on the on duration and receive paging messages or perform other activities. The eDRX configuration may specify an eDRX cycle length.

In 1806, the base station may transmit a notification to the UE to modify the DRX cycle length. This modification may be based on a message, e.g., a broadcast message such as an emergency message. For example, in one embodiment, the base station may transmit the message during an off duration of the eDRX cycle (e.g., within the eDRX cycle). For example, the base station may broadcast a message (such as an emergency message, although other types of messages are envisioned) to a plurality of UEs during an off duration of the eDRX cycle. The notification to modify the DRX cycle length may be performed in response to transmitting the message. For example, the modification may be performed so that the UE can receive a repetition of the message. Alternatively, or additionally, the base station may modify the DRX cycle length prior to transmitting the message, e.g., the base station may proactively change the DRX cycle length so that the UE can receive the first transmission of the message.

The modification may be a modification of eDRX to iDRX (e.g., to use the shorter cell-wide iDRX cycle length instead of the longer UE-specific eDRX cycle length). Alternatively, or additionally, the modification may be a change of length of the eDRX cycle (e.g., shortening the eDRX length from a longer length to a shorter length). The modification may be a renegotiation (involving communication from the UE to the base station) or may be performed without any input from the UE (e.g., involving the base station simply notifying the UE of the change in length or of the change from eDRX to iDRX).

Accordingly, in 1808, the UE may receive the message during an on duration of the modified DRX cycle. The message may be broadcast to a plurality of UEs. As noted above, transmitting the message may include transmitting one or more system information blocks (SIBS) to the UE.

After receiving the message, the modified DRX may be modified again, e.g., reverting back to the previous configuration or using another configuration, as desired. For example, the iDRX may be changed back to eDRX or the eDRX cycle length may be modified to a longer value than the shortened value used for receiving the message.

Figure 19:
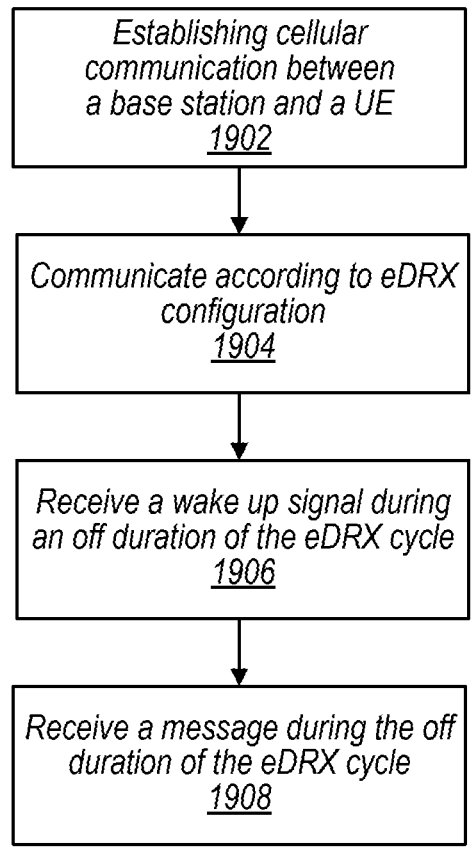

FIG. 19—Reconfiguration of DRX

FIG. 19 illustrates exemplary techniques for providing messages to a UE by using wake up signals. Aspects of the method of FIG. 19 may be implemented by a wireless device, such as the UE(s) 106/107, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1902, the network (e.g., the base station) and the UE may establish communication and configure eDRX.

In 1904, the base station and the UE may communicate according to the eDRX configuration. For example, the UE may sleep during the off duration of the eDRX and may wake on the on duration and receive paging messages or perform other activities. The eDRX configuration may specify an eDRX cycle length.

In 1906, while communicating with the base station using the eDRX configuration, the UE may receive a wake up signal during an off duration of the eDRX cycle. The wake up signal may indicate a message, such as a broadcast message. Similar to above, the broadcast message may be an emergency message.

In some embodiments, the UE may include first communication circuitry (e.g., low power receive circuitry) that may monitor for wake up signals, e.g., at a periodicity that is shorter than the eDRX cycle length. For example, the UE may monitor for wake up signals using an iDRX cycle length.

In 1908, in response to the wake up signal, the UE may receive the message (e.g., the broadcast message) during an off duration of the eDRX cycle. The UE may receive the message using second communication circuitry (e.g., the full-power reception circuitry). The message may be broadcast to a plurality of UEs. As noted above, transmitting the message may include transmitting one or more system information blocks (SIBS) to the UE.

After receiving the message, the UE may continue to operate according to the eDRX configuration.

Note that any or all of the embodiments described herein may be combined or integrated as desired. For example, indicating the presence of messages in paging could be applied to any of the embodiments of FIGS. 6-20. Similarly, any of the embodiments of those Figures may apply to each other, as desired.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a network device, including:
establishing cellular communication with a user equipment (UE);
configuring extended discontinuous reception (eDRX) with the UE;
communicating with the UE using the eDRX configuration, including an eDRX cycle of the UE;
broadcasting a message to a plurality of UEs during an off duration of the eDRX cycle of the UE;
caching the message;
transmitting a short message to the UE during an eDRX on duration of the UE, wherein the short message indicates the message is cached; and
transmitting the cached message to the UE.

2. The method of claim 1, wherein said transmitting the cached message to the UE is performed during an on duration of the eDRX cycle.

3. The method of claim 1, wherein said transmitting the cached message to the UE is performed in response to transmitting the short message.

4. The method of claim 1, wherein said transmitting the cached message to the UE comprises broadcasting the cached message to a plurality of UEs.

5. The method of claim 1, wherein said transmitting the cached message to the UE is performed in response to receiving a request from the UE to receive the cached message.

6. The method of claim 1, wherein said transmitting the cached message comprises transmitting one or more system information blocks (SIBs) to the UE.

7. The method of claim 1, wherein the message comprises an emergency message.

8. An apparatus, comprising:
at least one memory medium storing program instructions for execution within a network device;
at least one processor coupled to the at least one memory medium, configured to execute the program instructions to cause the network device to:
establish cellular communication with a user equipment (UE);
configure extended discontinuous reception (eDRX) with the UE, including an eDRX cycle of the UE;

communicate with the UE using the eDRX configuration;

broadcast a message to a plurality of UEs during an off duration of the eDRX cycle of the UE;

cache the message;

transmit a short message to the UE during an eDRX on duration of the UE, wherein the short message indicates the message is cached; and transmit the cached message to the UE.

9. The apparatus of claim 8, wherein said transmitting the cached message to the UE is performed during an on duration of the eDRX cycle.

10. The apparatus of claim 8, wherein said transmitting the cached message to the UE is performed in response to transmitting the short message.

11. The apparatus of claim 8, wherein said transmitting the cached message to the UE comprises broadcasting the cached message to a plurality of UEs.

12. The apparatus of claim 8, wherein said transmitting the cached message to the UE is performed in response to receiving a request from the UE to receive the cached message.

13. The apparatus of claim 8, wherein said transmitting the cached message comprises transmitting one or more system information blocks (SIBs) to the UE.

14. The apparatus of claim 8, wherein the message comprises an emergency message.

15. A network device, comprising:

communication circuitry; and at least one processor coupled to the communication circuitry, wherein the at least one processor is configured to cause the network device to:

establish cellular communication with a user equipment (UE);

configure extended discontinuous reception (eDRX) with the UE including an eDRX cycle of the UE;

communicate with the UE using the eDRX configuration;

broadcast a message to a plurality of UEs during an off duration of the eDRX cycle of the UE;

cache the message;

transmit a short message to the UE during an eDRX on duration of the UE, wherein the short message indicates the message is cached; and transmit the cached message to the UE.

16. The network device of claim 15, wherein said transmitting the cached message to the UE is performed during an on duration of the eDRX cycle.

17. The network device of claim 15, wherein said transmitting the cached message to the UE is performed in response to transmitting the short message.

18. The network device of claim 15, wherein said transmitting the cached message to the UE comprises broadcasting the cached message to a plurality of UEs.

19. The network device of claim 15, wherein said transmitting the cached message to the UE is performed in response to receiving a request from the UE to receive the cached message.

20. The network device of claim 15, wherein said transmitting the cached message comprises transmitting one or more system information blocks (SIBs) to the UE.

* * * * *